Oct. 19, 1926.
J. P. LORENZ
1,603,784
CHRISTMAS TREE STANDARD
Filed Sept. 4, 1923   2 Sheets-Sheet 1
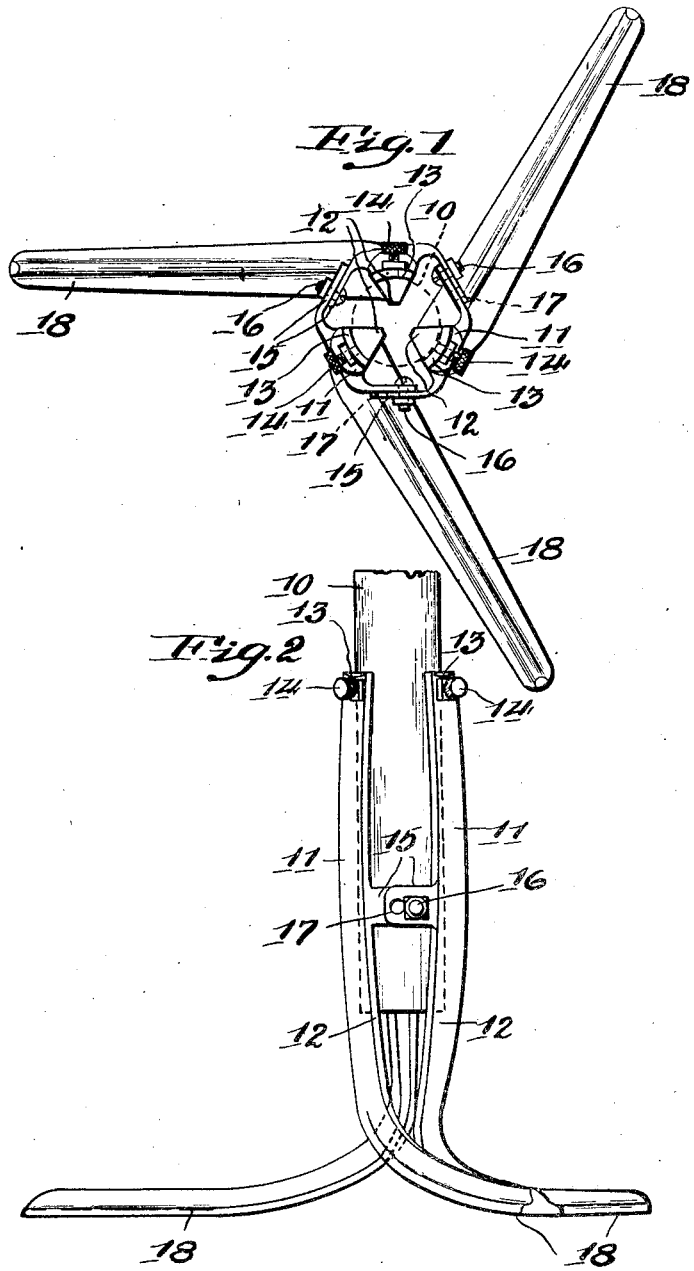
Inventor
John P. Lorenz
By John E. Stryker
his Attorney Oct. 19, 1926.
J. P. LORENZ
1,603,784
CHRISTMAS TREE STANDARD
Filed Sept. 4, 1923   2 Sheets-Sheet 2
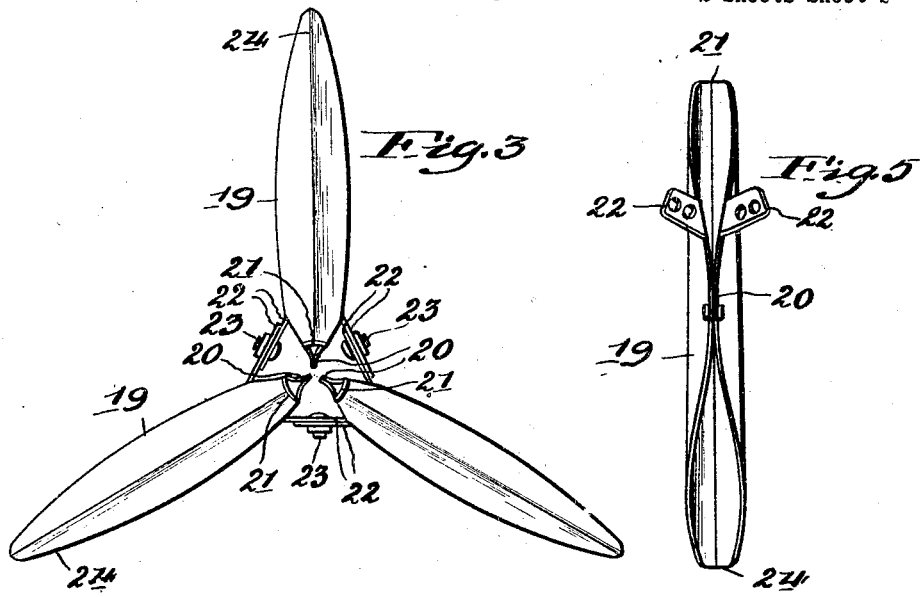
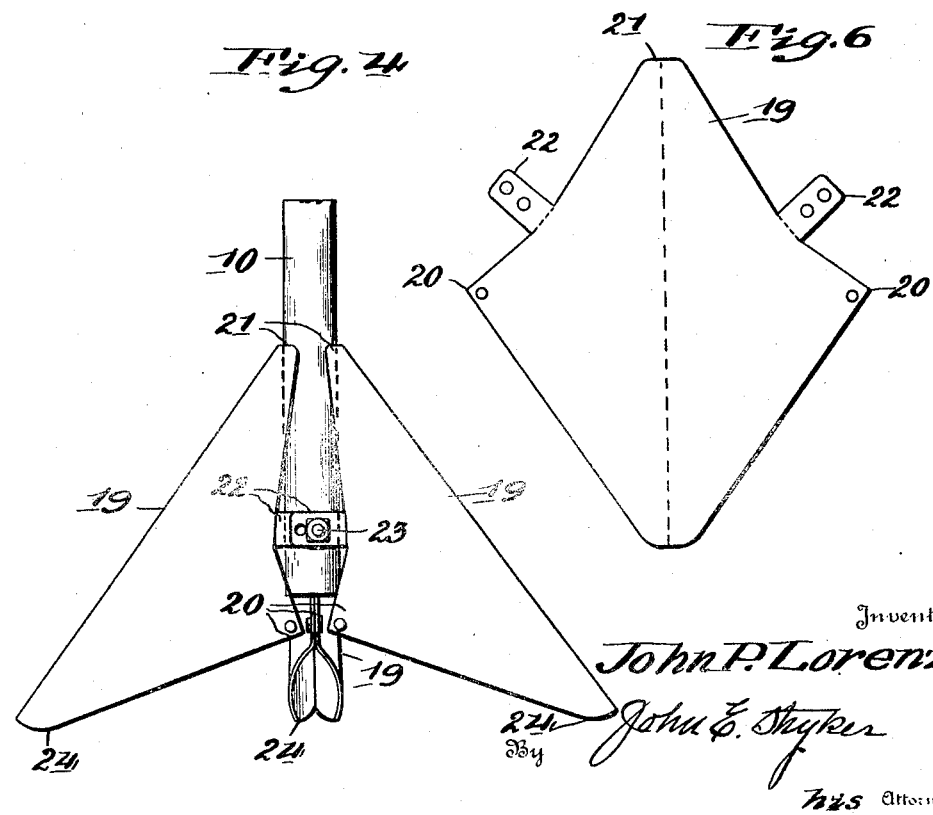
Inventor
John P. Lorenz
By John E. Stryker
his Attorney Patented Oct. 19, 1926.

1,603,784

UNITED STATES PATENT OFFICE.

JOHN P. LORENZ, OF ST. PAUL, MINNESOTA, ASSIGNOR OF ONE-THIRD TO JOHN HUNA AND ONE-THIRD TO EDWARD M. YENCH, BOTH OF ST. PAUL, MINNESOTA.

CHRISTMAS-TREE STANDARD.

Application filed September 4, 1923. Serial No. 660,700.

This invention relates to an improvement in Christmas tree standards.

The object of this invention is to provide simplified and highly efficient means for securely holding the trunk of a tree in upright position.

A further object is to provide a standard with gripping means adapted to fit tree trunks of widely different sizes.

Another object is to so form the supporting legs and gripping elements that the trunk of a tree may be securely held independently of the weight on the legs.

The present device is composed entirely of a plurality of similar units secured together by bolts, each unit being formed to constitute a gripping element and a leg. The construction of the standard from similar units results in great economy of manufacture. Heretofore, as far as applicant is aware, standards, other than those composed of wooden slats, have been provided with either a central socket and legs which also act as gripping levers or the device has been constructed entirely of rods by which the weight of the tree is transmitted from the supporting legs to the gripping elements. Most of these prior devices are so constructed that the larger the tree supported thereby, the smaller is the spread of the legs, whereas, it is obvious that if there is any difference in this respect, the larger trees should have the broader base upon which to stand. With the preferred form of the present invention, the spread of the base remains practically constant for all sizes of trees.

Referring to the accompanying drawings, which illustrate my invention, Figure 1 is a plan view of the preferred form. Fig. 2 is a side elevation of the same, Fig. 3 is a plan view of an alternate form, Fig. 4 is a side elevation of the alternate form. Fig. 5 is a detail elevation of one of the units of the alternate form and, Fig. 6 shows said unit as it appears after being stamped from sheet metal and before being folded to final shape.

In the drawings, I have used the numeral 10 to indicate the trunk of a tree. Three pivotally joined gripping elements 11 formed with downwardly converging lower ends 12 are adapted to support and be actuated by the base of the trunk 10. Upper extremities 13 on the elements 11 are adapted to bear upon the periphery of the trunk 10 above its base and are tapped to receive adjusting screws 14 for the purpose hereinafter described. The elements 11 are shaped laterally extending ears 15 arranged to be joined by bolts 16 to form a central socket for the trunk 10. Each of the ears 15 are pierced by a plurality of holes 17 which register with like holes in the ear to be articulated therewith. Extending downward and outward from the lower end of each of the elements 11 is a leg 18. It is to be noted that the leg 18 extends laterally from the element 11 at right angles to the plane in which said element pivots upon the bolt 16.

In use the trunk 10 is inserted in the socket formed by the elements 11 and is forced downward against the converging lower ends 12 thereof. This presses the upper extremities 13 against the periphery of the trunk. As will now be readily understood, the weight of the tree upon the lower ends of the elements 11 will always maintain the gripping pressure between the upper ends of said elements. If, as is frequently the case, the trunk 10 is irregular on its periphery adjacent to the ends 13, one or more of the adjusting screws 14 may be turned inward to compensate for the irregularity and hold the trunk in the desired upright position.

It will be evident that within comparatively wide limits, trees of different sizes may be inserted between the gripping elements 11 without changing the position of the bolt 16. Thus, the smaller trees will extend farther down than the larger ones upon the converging ends 12 of the elements 11. The size of the tree that can be supported is only limited by the size of the polygon formed by the ears 15 and intermediate portions of the elements 11. To support a larger tree, the size of this polygon is increased by inserting the bolts 16 in perforations nearer the ends of the ears 15. It is to be noted in this preferred form of my device, that the spread of the legs, and resulting size of the base, is not materially changed by pivoting the elements 11 on the bolts 16.

In the alternate form of my device shown in Figs. 3 to 6 inclusive, the units 19 are made of sheet metal, the shape of the stamped sheet before folding being shown in Fig. 6. The units after being stamped or cut to the shape shown are merely folded on the dotted lines indicated in Fig. 6, the corners 20 of each unit being riveted together to form the base or converging end of the gripping element. The ears 22, as in the preferred form are provided with a plurality of perforations for the bolts 23 so as to permit changing of the size of the socket to fit different trees. An upper end 21 of each of the legs, when assembled, bears upon the periphery of the tree trunk 10 above its base, while ears 22 are connected in pairs by bolts 23. Obliquely downward extending portions 24 constitute the legs upon which the tree is supported.

The operation of the alternate form is similar to that described above for the preferred form, except that to some slight extent the size of the supporting base is affected by the size of the tree inserted between the gripping elements. The trunk 10 is inserted between the elements 19 and forced downward against the converging ends 20 of the socket, when said elements will be pivoted upon the bolts 23 to firmly grip the trunk with the upper ends 21.

The alternate form of my device, while it does not combine all of the advantageous features of my preferred form, does have the advantage of greater cheapness. Obviously the number of legs or units can be increased at will without departing from the spirit of my invention.

Having described my invention what I claim as new and desire to protect by Letters Patent is:

1. In a standard of the class described, a series of gripping elements pivotally joined one to another intermediate their ends to form a socket for a trunk, gradually converging lower ends on said elements adapted to grip a trunk in said socket, adjusting screws severally threaded in the upper ends of said elements to impinge against a trunk in said socket whereby the lower ends of said elements may be pressed inward to firmly grip said trunk, and means for supporting said elements in substantially upright position.

2. A standard composed wholly of not more than four similar body units, each unit having a substantially upright, gripping element, adapted to be pressed inward at its lower end against the periphery of a trunk near the base thereof, an integral leg on the lower end of each of said units, and adjustable means on the upper end of each of said units for engaging the trunk, the several units being joined by bolts located above the lower ends of the gripping elements to form a socket, adapted to receive and hold trunks of different sizes.

3. In a standard, a series of gripping elements pivotally joined one to another to form a socket for a trunk, each of said elements being arranged to pivot in a substantially vertical plane, and a leg rigidly connected with each of said elements and projecting at an angle with the pivotal plane.

4. In a standard, a series of gripping elements pivotally joined to form a socket adapted to receive a trunk, each of said elements arranged to grip the trunk with its lower end, adjustable means on the upper end of each of said gripping elements for engaging a trunk, and diverging legs rigidly connected to said elements, said legs extending substantially perpendicularly to the pivotal plane of said elements whereby the spread of said legs is substantially unaffected by pivotal movement of said elements.

In testimony whereof, I have hereunto signed my name to this specification.

JOHN P. LORENZ.